W. H. SMOOTE.
MAKING WOODEN VESSELS.
No. 31,487. Patented Feb. 19, 1861.
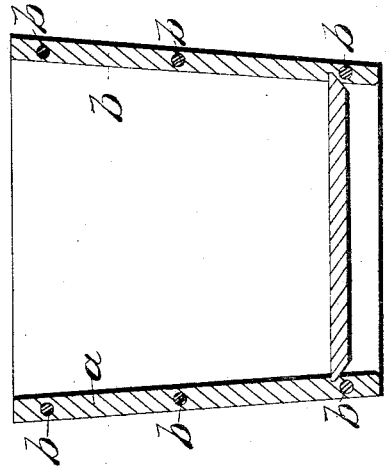
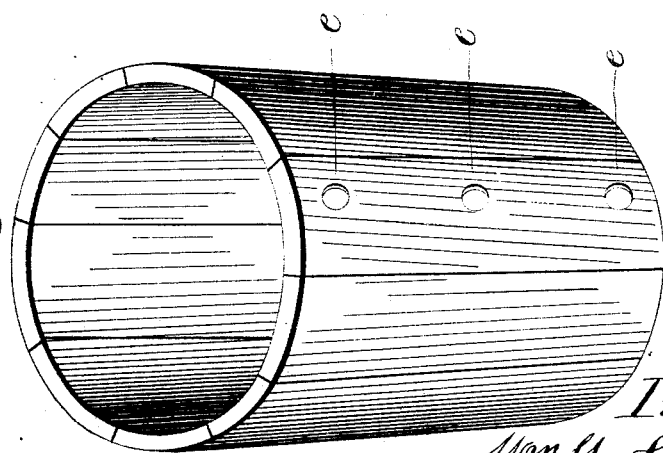

UNITED STATES PATENT OFFICE.

WILLIAM H. SMOOTE, OF PRINCE WILLIAM COUNTY, VIRGINIA, ASSIGNOR TO HIMSELF, FRANKLIN TAYLOR, C. A. NELSON, AND MONTREVILLE CORNNELL, OF SAME PLACE.

IMPROVED METHOD OF MAKING WOODEN VESSELS OF STAVES.

Specification forming part of Letters Patent No. 31,487, dated February 19, 1861.

*To all whom it may concern:*

Be it known that I, W. H. SMOOTE, of the county of Prince William and State of Virginia, have invented a new and useful Mode of Forming Barrels, Casks, Tubs, &c.; and I do hereby declare that the following is a full, clear, and exact description thereof, reference being had to the accompanying drawings, and to the letters of reference marked thereon, in which—

Figure 1 is a perspective view. Fig. 2 is a vertical section showing the manner of fastening the staves.

The nature of my invention consists in the manner of making barrels, casks, tubs, &c., without external hoops or bands, as hereinafter specified.

To enable others skilled in the art to make and use my invention, I will describe its construction and operation.

In Fig. 1 no hoops are seen binding the staves together.

In Fig. 2, *a* are the staves; *b*, the bands or hoops, made of iron wire. The staves are dressed up and jointed, as usual. I then with a center-bit bore holes from each side of the stave, making the hole through the stave as near the outer side of the stave as possible, leaving the main part on the inside of the hole to give strength to the same. I then take a piece of wire having a hook bent on one end, and commence putting the staves on it. A portion of the first and last stave is cut out on the outer side to receive the lap of the wire or band. I then put all the staves on the wire, and bend the other end after putting it through the hook on the end where I began to put on the staves.

I then draw the vessel up tight with the truss-hooks. Then with a pair of pliers I draw the wire tight, thus forcing the staves tightly together and making a firm and water or fluid tight vessel—either barrel, cask, churn, or any vessel of wood made out of staves—thus forming a wooden vessel perfectly fluid-tight without any external hoops, which gives beauty to the outward appearance of the vessel. I can also make any shape—round or octagon, &c.—and elaborately cover pitchers and such like vessels, if I wish to do so. After the vessel is thus put up, the head or bottom is put in, as is usual, before the band is clinched and drawn to its required tightness. The openings where the bands are fastened can be covered with a piece of wood let in; or in pouring the melted metal into the holes the metal may be allowed to fill the holes flush with the wood.

By this mode of making wooden vessels I am enabled to make a much stronger and more durable vessel than heretofore done, as the hoops cannot fall off or become broken, and also give a much neater appearance to the work.

Having thus described my invention, what I claim is—

Forming barrels, casks, and other vessels of wood without external hoops by the mode herein described and set forth, and the purposes mentioned.

WM. H. SMOOTE.

Witnesses:
T. G. CLAYTON,
E. D. CLAPP.